United States Patent [19]
Laborde et al.

[11] Patent Number: 5,857,154
[45] Date of Patent: Jan. 5, 1999

[54] MULTIPROTOCOL MOBILE TELEPHONE NETWORK HAVING HIGH TIER AND LOW TIER SYSTEMS

[75] Inventors: Enrique Laborde, Gaithersburg; Lenard S. Golding, Potomac, both of Md.

[73] Assignee: Hughes Electronics Corporation, Los Angeles, Calif.

[21] Appl. No.: 680,896

[22] Filed: Jul. 16, 1996

Related U.S. Application Data

[63] Continuation of Ser. No. 312,916, Sep. 30, 1994, abandoned.

[51] Int. Cl.[6] .................................................. H04Q 7/22
[52] U.S. Cl. ........................... 455/444; 455/445; 455/448
[58] Field of Search .............................. 455/69, 126, 127, 455/74, 444, 445, 448, 507, 517, 524, 526; 379/58, 59, 63; 375/200–205, 220

[56] References Cited

U.S. PATENT DOCUMENTS

| | | | |
|---|---|---|---|
| 4,989,230 | 1/1991 | Gillig et al. ............................... | 455/74 |
| 5,129,098 | 7/1992 | McGirr et al. ............................ | 455/126 |
| 5,265,263 | 11/1993 | Ramsdale et al. ....................... | 455/54.1 |
| 5,278,991 | 1/1994 | Ramsdale et al. ....................... | 455/33.2 |
| 5,291,516 | 3/1994 | Dixon et al. ............................ | 375/200 |
| 5,361,399 | 11/1994 | Linquist et al. ........................ | 455/56.1 |
| 5,381,443 | 1/1995 | Borth et al. ............................. | 455/33.4 |
| 5,386,589 | 1/1995 | Kanai ........................................ | 455/69 |
| 5,392,453 | 2/1995 | Gudmundson et al. ................ | 455/56.1 |
| 5,509,035 | 4/1996 | Tiedemann, Jr. et al. .............. | 455/33.2 |

FOREIGN PATENT DOCUMENTS 0521609   1/1993   European Pat. Off. .................. 379/58

*Primary Examiner*—Edward F. Urban
*Attorney, Agent, or Firm*—John T. Whelan; Michael Sales

[57] ABSTRACT

A multiprotocol radio communications network that includes a first plurality of stationary transceivers for handling low-tier traffic and a second plurality of stationary transceivers for handling high-tier traffic. The stationary transceivers communicate information to a mobile transceiver at different information rates. A switching center automatically switches communication between the mobile transceiver and the stationary transceivers as the mobile transceiver moves between areas of different traffic density.

16 Claims, 3 Drawing Sheets

MULTIPROTOCOL MOBILE TELEPHONE NETWORK HAVING HIGH TIER AND LOW TIER SYSTEMS

This is a continuation of application Ser. No. 08/312,916, filed Sep. 30, 1994, now abandoned.

BACKGROUND OF THE INVENTION

1. Field of the Invention

The present invention generally relates to a mobile telephone system, and, more particularly, to a mobile telephone system employing multiple protocols.

2. Description of the Related Art

A typical mobile telephone system includes a mobile station and multiple fixed stations. The mobile station initially accesses the system by selecting the fixed station having a signal that is most strongly received by the mobile station. A problem with this system is that a mobile station may move between areas having different densities of active mobile stations. It is difficult for such a system to be optimally configured for both the low and high density areas.

SUMMARY OF THE INVENTION

It is an object of the present invention to provide a telephone system that is optimized for both low and high density areas.

Additional objectives and advantages of the invention will be set forth in the description that follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a system comprises a mobile transceiver; a first plurality of stationary transceivers, each including means for sending a speech signal to the mobile transceiver at a first information rate; a second plurality of stationary transceivers, each including means for sending a speech signal to the mobile transceiver at a second information rate less than the first information rate; means, operable when the mobile transceiver is receiving a speech signal from one of the first plurality of stationary transceivers, for causing the mobile transceiver to receive the speech signal from another one of the first plurality of transceivers or from one of the second plurality of transceivers. In a preferred embodiment, the mobile transceiver includes means for determining a first signal strength of a signal from a determined one of the first plurality of transceivers, means for determining a second signal strength of a signal from a determined one of the second plurality of transceivers; and means for transmitting to a selected one of the determined ones of the first or second plurality of transceivers, depending on the values of the first and second signal strength.

According to another aspect of the present invention, a system comprises a mobile transceiver; a first plurality of stationary transceivers, each including means for sending a speech signal to the mobile transceiver at at least 32 kilobits per second; a second plurality of stationary transceivers, each including means for sending a speech signal to the mobile transceiver using the North American Analog Cellular Standard of the Telecommunication Industry Association; means, operable when the mobile transceiver is receiving a speech signal from one of the first plurality of transceivers, for causing the mobile transceiver to receive the speech signal from another one of the first plurality of transceivers or from one of the second plurality of transceivers.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT

Figure 1:
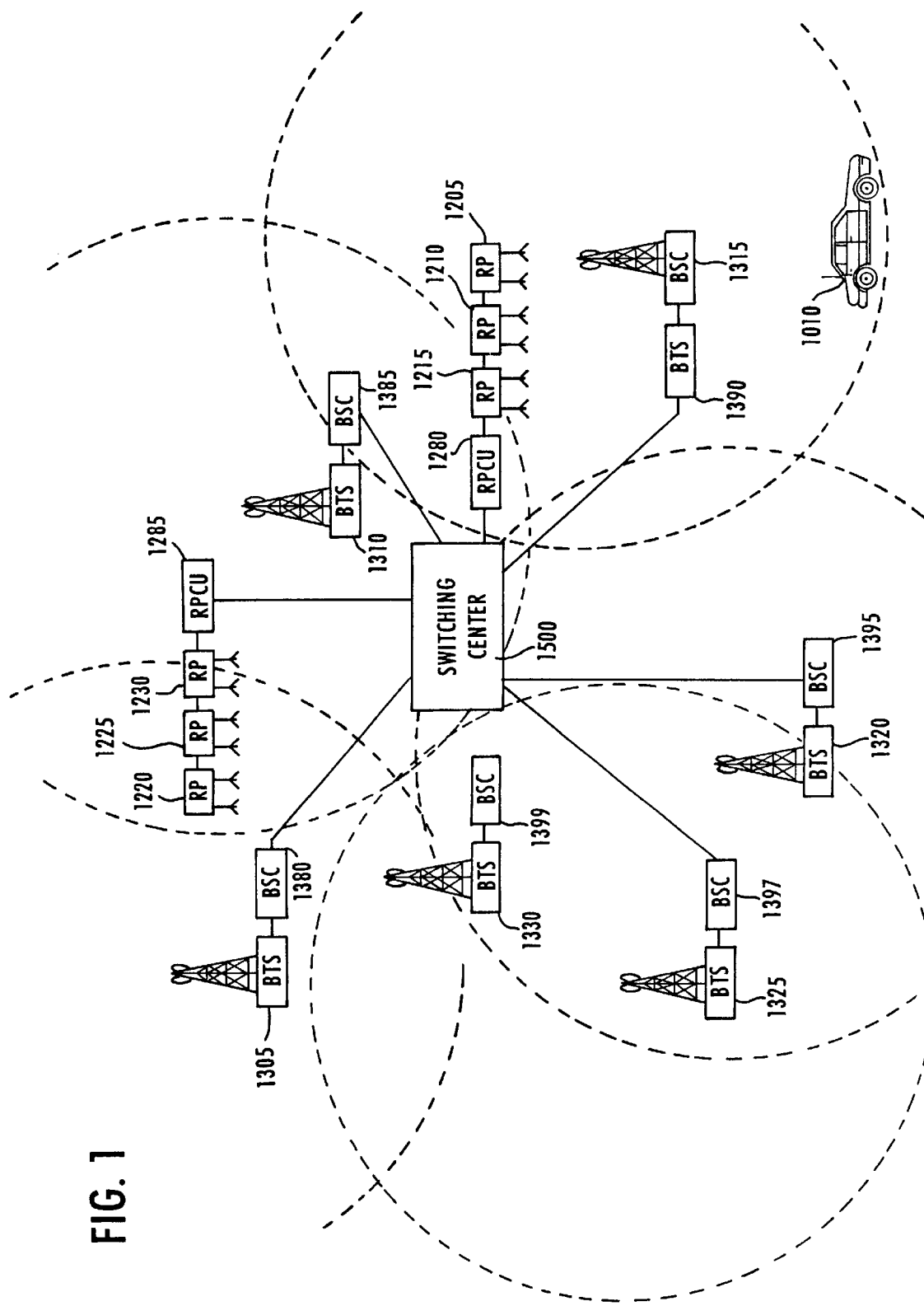
FIG. 1 is a block diagram of a mobile communication system in accordance with a preferred embodiment of the invention.

In the preferred communication system, as shown in FIG. 1, mobile telephone 1105 transmits and receives voice data with one of radio ports 1205, 1210, 1215, 1220, 1225, or 1230, or with one of base stations 1305, 1310, 1315, 1320, 1325, and 1330. A radio port such as radio port 1210 is typically located at a relatively low height, such as on a lamppost. Radio port 1210 communicates with relatively low power. A base station such as base station 1310 is typically located at a relatively high height, such as on a radio tower. Base station 1310 communicates with relatively high power.

Switching center 1500 cooperates with base station control units 1380, 1385, 1390, 1397, and 1399, and with radio port control units 1285 and 1280, to route a telephone connection from mobile telephone 1105 to another mobile telephone or to a fixed telephone.

The portion of the system including radio ports 1205, 1210, 1215, 1220, 1225, and 1230, is designated the "low tier" because this portion of the system is optimized for low mobility traffic, such as mobile telephones carried by pedestrians. The low tier covers areas, such as city business districts, shopping malls, and airports, where the traffic mobility is low and the traffic density is high.

The section of the system including base stations 1305, 1310, 1315, 1320, 1325, and 1330 is designated the "high tier" because this portion of the system is optimized for relatively high mobility traffic, such as mobile telephones inside automobiles. This high mobility adds complexity in cell handoff processing, as compared to the low tier. Compared to the low tier, the high tier is also characterized by high transmitter power, low voice quality, a large cell size, and low traffic density.

The high tier system covers more area than the low tier and generally overlaps areas covered by the low tier. Thus, the base stations cover a certain area that may include subareas also under control of the radio ports.

Although only two mobile telephones are shown in FIG. 1, an actual system would have thousands of wireless telephones, sometimes called "subscriber units" (SU). The subscriber units may be mobile as shown in FIG. 1 or may be fixed.

Figure 2:
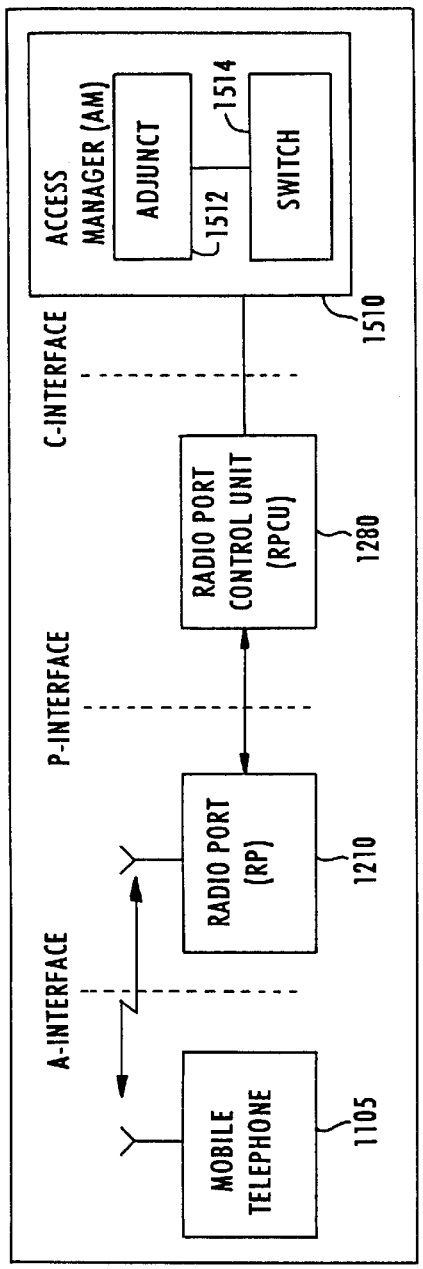
FIG. 2 is a block diagram emphasizing a portion of the system shown in FIG. 1 in more detail.

FIG. 2 emphasizes certain aspects of the low tier portion of the system of FIG. 1. As discussed in more detail below, the interface between a mobile telephone and a radio port is designated the A-interface, the interface between radio port 1210 and radio port control unit 1280 is designated the P-interface, and the interface between radio port control unit 1280 and mobile switching center 1500 is designated the C-interface.

In a preferred embodiment, the mobile transceiver 1105 includes means for determining a first signal strength 1110 of a signal from a determined one of the first plurality of transceivers 1205, 1210, 1215, 1220, 1225, 1230; means for determining a second signal strength 1115 of a signal from a determined one of the second plurality of transceivers 1305, 1310, 1315, 1320, 1325, 1330; and means for transmitting 1120, 1125 to a selected one of the determined ones of the first plurality of transceivers 1205, 1210, 1215, 1220, 1225, 1230 or second plurality of transceivers 1305, 1310, 1315, 1320, 1325, 1330, depending on the values of the first signal strength 1110 and second signal strength 1115. Access manager 1510 within switching center 1500 provides call control and mobility control functions and switches the voice paths between the low tier and the Public Switched Telephone Network (PSTN). Access manager 1510 includes an adjunct 1512 and a switch 1514 that may or may not be dedicated to low tier but that is under the control of the adjunct.

This partition of the access manager is based on the Intelligent Network model that removes the switching and control logic from the switch and places it in the Service Control Point (SCP) or an adjunct computing platform. Adjunct 1512 supports the execution of call control, management, billing, database and signaling interface functions of the low tier. The switch provides the PSTN access capabilities to the local network, the toll network, operators, directory assistance, and emergency (911) services.

Figure 3:
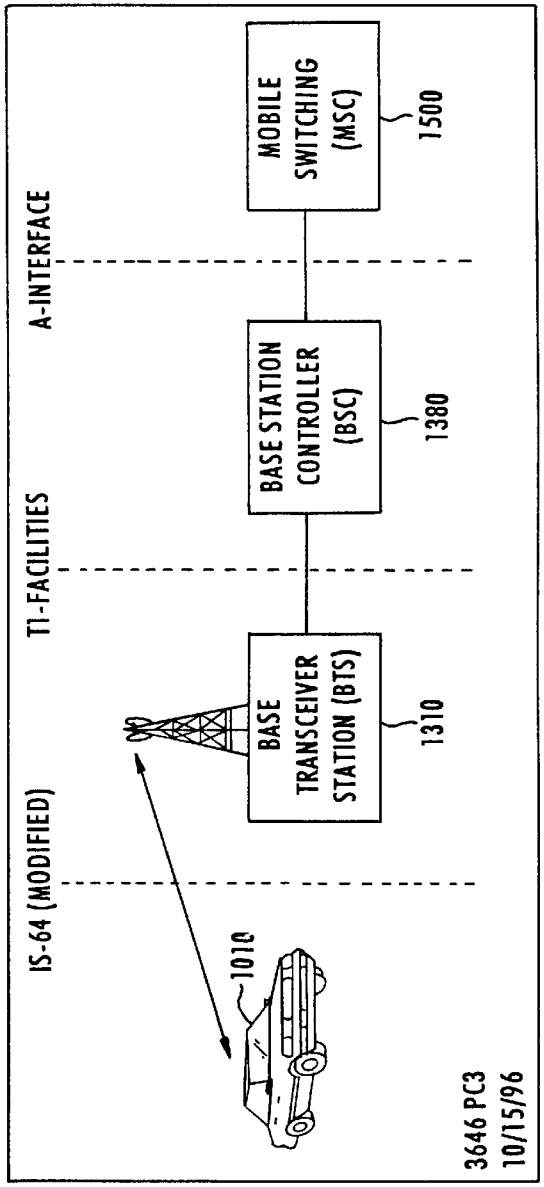
FIG. 3 is a block diagram emphasizing another portion of the system shown in FIG. 1 in more detail.

FIG. 3 emphasizes certain aspects of the high tier portion of the system shown in FIG. 1. As discussed in more detail below, base station 1310 communicates with a mobile telephone in automobile 1010 using an IS-54 compatible protocol. The basic architecture for the high tier shown in FIG. 3 corresponds with that recommended for the Global System for Mobile (GSM) digital cellular standard developed in Europe, which defines two major subsystems interconnected via a standard interface designated the A-Interface.

Figure 4:
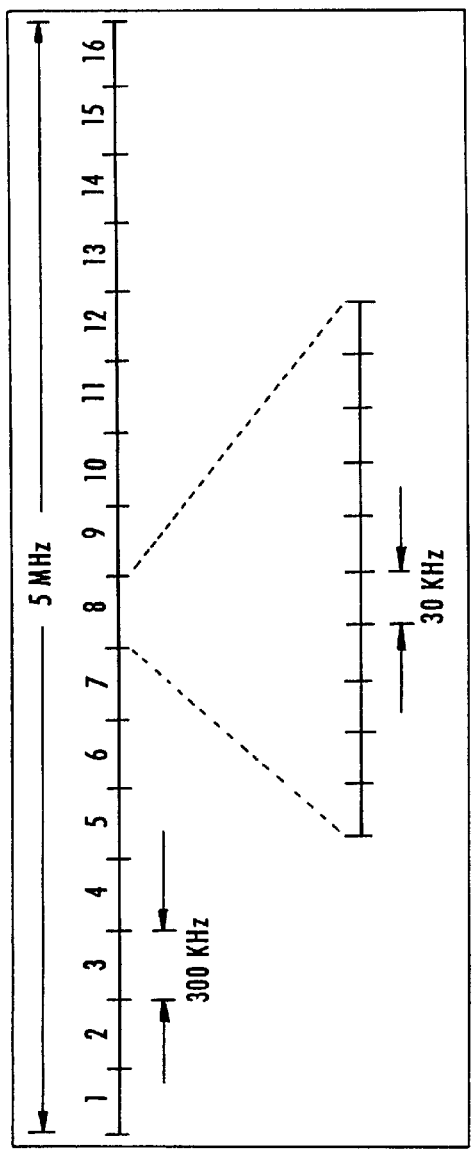
FIG. 4 is a frequency spectrum diagram showing channel allocation in the preferred communication system.

FIG. 4 shows a preferred frequency allocation scheme. This common frequency plan for the low and high tiers allows simple frequency channel allocation strategies to minimize intertier interference. The common frequency plan results from evenly dividing the minimum FCC allocated licensed band of 5 MHz in each direction into 16 RF channels of 300 kHz, with each RF channel accommodating a centered low tier carrier. Each 300 kHz RF channel is further divided into ten RF subchannels of 30 kHz, where the subchannels accommodate high tier carriers.

The basic channel allocation strategy, to avoid intertier interference within coverage areas common to the low and high tiers, allocates different frequency bands of the available spectrum to the low and high tier according to the traffic requirements.

Figure 5:
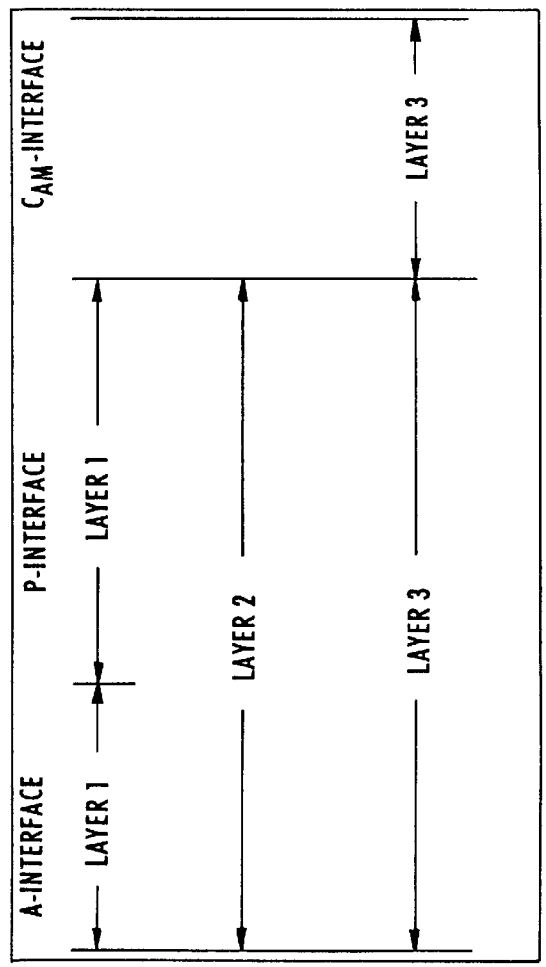
FIG. 5 is a diagram illustrating a protocol employed by some of the fixed stations shown in FIG. 1.

FIG. 5 shows three standard low tier interfaces (A, P, C), defined to separate elements built by radio manufacturers from elements built by switch vendors. Interface A is the air interface that connects mobile telephones to the radio ports. The A interface uses Time Division Multiplexing (TDM) on the forward direction, radio port to mobile telephone, and Time Division Multiple Access (TDMA) on the reverse direction, mobil telephone to radio port.

Interface P is the interface between radio ports and radio port control units. Although several options exist for the implementation of interface P (e.g., fiber, coax, radio, and several types of transmission network facilities), the preferred telephone system employs the T1 network facilities to achieve the necessary bandwidth for combining several radio ports.

Interface C is the interface between radio port control units and access manager 1500. Interface C includes two interfaces, designated as $C_{SW}$ and $C_{AM}$. $C_{SW}$ provides the voice path and basic call control between the radio port control unit and the switch using $\mu$-law 64-kbps PCM. $C_{AM}$ provides additional call control, mobility management and other messages between the radio port control unit and access manager 1500 specific to the low tier.

The $C_{AM}$ low tier interface has three layers independent of the underlying transport protocol used to interconnect a radio port control unit to the AM-Adjunct. The transport mechanism for $C_{AM}$ can be implemented in several ways depending on the number of lines, availability, and economics. For example, in switch implementations providing Integrated Services Digital Network (ISDN) Basic Rate Interfaces (BRI) (2B+D) or Primary Rate Interfaces (PRI) (23B+D), the B channels provide the voice path of the $C_{SW}$ interface, and the D channel of the BRI or PRI provides the transport between the radio port control unit and the AM-Adjunct.

In a different implementation, the $C_{AM}$ transport is provided directly between the radio port control unit and the AM-Adjunct through a transport protocol such as TCP/IP or X.25 over transmission media segregated from that used for the $C_{SW}$ interface.

FIG. 5 shows the mapping of the different signaling layers between the three standard interfaces. At the physical level, layer 1, the radio port maps the air interface (A) to the physical layer of the distribution network. The radio port, however, has no protocol function other than relaying the data link level (layer 2) messages and the network level (layer 3) messages. This transparency of the radio port to layers 2 and 3 simplifies the radio port implementation.

Layer 2 protocols monitor and maintain the quality of the radio link. The capabilities to establish and maintain link performance are shared between the mobil telephone 1105 and the radio port control unit.

Layer 3 includes the messages and procedures to set up, control, and terminate end-to-end connections the low tier. The exchange of layer 3 messages takes place between entities located at the mobil telephone, the radio port control unit, and the Access manager 1500.

The interworking between different low tier systems, or between a low tier system and cellular systems, is provided by an interworking protocol, such as IS-41 using CCITT Signaling System No. 7 (SS7) as the lower layers to implement the data link and transport functions.

The low tier employs 2-Ghz operation according to FCC spectrum allocation for licensed operators, Frequency Division Duplexing (FDD) with 50 MHz or 80 MHz separation between forward and reverse carriers, a channel spacing of 300 kHz between carriers within the forward and reverse bands using Frequency Division Multiple Access (FDMA), $\pi/4$ DQPSK modulation, with 2 bits per symbol (DQPSK could also be used), Time Division Multiplexing (TDM) for radio port to mobile telephone multiplering with 400–800 mW average RF power, Time division Multiple Access (TDMA) for mobile telephone to radio port multiple access with 10–20 mW average RF power per active timeslot, a TDM Frame Structure of eight timeslots of 100 bits each in a 2-msec frame, with a super frame overlay, transmission rate of 400 kbps equivalent to 200 ksymbol/sec.

Additional details of the low tier are disclosed in Bellcore Technical Reference TR-INS-001313, Issue 1, October 1993, "Generic Criteria for Version 0.1 Wireless Access Communications Systems (WACS). A procedure for frequency allocation within the low tier may be found in U.S. Pat. No. 5,212,831 to Chuang et al., issued May 18, 1993, for METHOD AND APPARATUS FOR AUTONOMOUS ADAPTIVE FREQUENCY ASSIGNMENT IN TDMA PORTABLE RADIO SYSTEMS, the contents of which are herein incorporated by reference. Additional details of the processing of a mobile telephone within the low tier may be found in U.S. Pat. No. 4,849,991 to Arnold et al., issued Jul. 18, 1989, for METHOD AND CIRCUITRY FOR DETERMINING SYMBOL TIMING FOR TIME DIVISION MULTIPLE ACCESS RADIO SYSTEMS, the contents of which is herein incorporated by reference; and U.S. Pat. No. 5,084,891 to Ariyavisitakul et issued Jan. 28, 1992, for TECHNIQUE FOR JOINTLY PERFORMING BIT SYNCHRONIZATION AND ERROR DETECTION IN A TDM/TDMA SYSTEM, the contents of which are herein incorporated by reference.

In the high tier, with both the forward and reverse channels spaced apart 30 kHz and each channel carrying 6 timeslots, the high tier provides either three 8 kbps voice channels, six 4-kbps voice channels.

The high tier employs a modification of IS-54 standard, designed to support the vehicular radio operating environment including urban high-rise, urban/suburban low-rise, residential, and rural.

The high tier has modulation, slot format, frame derivation, interleaving identical to the IS-54 air interface. The transmitted symbol rate is 24.3 ksps. The channel spacing is 30 kHz. The pairing of forward and reverse channels is modified to accommodate separation in the approved 2-GHz bands.

The high tier employs 2-Ghz operation according to FCC spectrum allocation, frequency division duplexing 30 kHz between carriers within the forward and reverse bands using frequency division multiple access (FDMA), π/4 DQPSK modulation where each symbol carries two bits of information, Square root 35% raised cosine baseband filtering, three mobile station power classes with nominal effective radiated power (ERP) of 4.0 watts, 1.6 watts and 0.6 watts, base station power output ERP of 40 watts, a TDMA frame makeup of 12 timeslots in a 40-msec frame, and a TDMA burst Reverse timeslot offset from paired forward timeslot to avoid duplexing at the mobile station. Speech coding is 16-kbps, 8-kbps, and 4-kbps voice using 4,2 and 1 timeslots, respectively. an 8-kbps speech codec is specified in IS-54.

A radio port, such as radio port 1210, communicates with most telephones at a 32 kbps information rate, while a base station, such as base-station 1310, communicates with most telephones at an 8 kbps information rate. Thus, the low tier sends speech information to a telephone at a much higher information rate than does the high tier.

The preferred embodiment of the present invention includes a digital control channel (DCC) to eliminate the reliance of IS-54 on the analog control channels by replacing them with setup channels contained in the slots of the modified IS-54.

Initial access of a mobile telephone to the low or high tier is initiated by the mobile telephone by identifying signal strengths within their nominal bandwidth of predetermined carriers including the control channels and registering on the Radio Port or Base Station with the strongest carrier.

The initial access procedure starts when a mobile telephone is turned on, and ends with the mobile telephone attempting to register in a suitable radio port. The initial access procedure includes a determination of the power level to which the mobile telephone transmission shall be set to execute the registration procedure.

At initialization, parameters are established to define the preferences that need to be matched during the initial access procedure. For example, mobile telephones built to operate in one or more frequency bands (i.e., unlicensed, licensed, cellular), sub-bands (i.e., low, high), and frequency blocks (i.e., A, B, C, . . . ) will specify the order in which these frequency blocks and bands will be searched. A mobile telephone having the capability to operate with different systems within the same frequency bank or block (i.e., high or low tier) must specify during the initialization state the sequence in which these modes will be searched.

Parameters are stored internally at the mobile telephone and transmitted in messages by the network side over the System Information Channel (SIC). As part of the SIC information, the mobile telephone 1105 accepts an Adjacent Radio Port (RP) Configuration message which includes a list of neighbor radio ports with the following parameters: radio port Frequency, Handoff_Threshold, Minimum relative signal strength, and RP_Transmit_Level. When the measured relative signal strength of a candidate radio port exceeds the relative signal strength of the current radio port in more than the Handoff_Threshold value, and the measured relative signal strength in the candidate radio port exceeds the Minimum relative signal strength, the mobile telephone performs an idle handoff of the candidate radio port.

The mobile telephone also determines the power level to which the transmit power of the mobile telephone shall be set to enter the registration procedure. This power level is computed by subtracting the measured relative signal strength from the RP_Transmit_Level to estimate the mean path attenuation. An initial power control procedure determines the power level to which the mobile telephone shall be set to execute the initial access procedure to a suitable radio port of an acceptable service provider. The main purpose of this initial access power control is prevent unacceptable levels of interference to other users.

The estimates initial power by first estimating the mean path attenuation to the radio port. The mean path attenuation, L, is obtained by subtracting the received signal strength measured at the mobile telephone 1105, RSS_SU, from the parameter EIRP_RP indicating the effective isotropically radiated power transmitted by the radio port:

$$L(dB)=EIRP\_RP(dbm)-RSS\_SU(dbm)$$

The mobile telephone power is initially set to the power level defined by the computed L(dB) and the parameter RSS_RP indicating the desired received signal strength at the radio port during the initial access. The mobile telephone initial power (SU_IN_PW) is obtained from:

$$SU\_IN\_PW(dbm)=L(dB)+RSS\_RP(dbm)$$

For example, with EIRP_RP=29 dbm, RSS_RP=-92 and a measured RSS_SU=-73 dbm, the attenuation is estimated as L=29+73=102 dbm and the mobile telephone Initial Power=102 92=10 dbm.

If the calculated mobile telephone Initial Power exceeds the maximum power level of the mobile telephone, the mobile telephone transmits at maximum power. If the calculated mobile telephone Initial Power is below parameter SU_MIN_PW, the minimum power required to access the radio port, the mobile telephone adjusts its initial power to the SU_MIN_PW(dbm).

When the transmission by the mobile telephone at the SU_IN_PW level fails, the mobile telephone increases the power level in each subsequent attempt by a value given by the parameter IN_PW_STEP. SUs are allowed a maximum number of attempts given by the parameter ACC_ATT_MAX.

The networking of infrastructure elements of the low and high tier can be achieved with several levels of integration. At the basic level, this networking is achieved by integrating the low and high tier subscriber profiles into a single database (HLR). The individual access managers in the low tier will use the HLR database and the mobile switching units in the high tier to coordinate the operations of the low and high tiers. Calls terminating at mobile telephones will be routed to the respective switches based on location information of the mobile telephones at the HLR according to registration on their current registration area and tier.

Integration of low and high tier beyond the switch is also possible with radio port control units or base station control units that support both the low and high tier air interfaces. These higher levels of integration could be simplified by adopting a common Level 3 messaging protocols for the low and high tier.

The system provides both intra-tier and inter-tier handoff. Intra-tier handoff is provided using handover mechanisms known in the art in both low and high tier.

Low to high tier handoff relies on a mobile telephone procedure that keeps the mobile telephone in the low tier until it is unable to find a low tier carrier exceeding a certain threshold. When the mobile telephone is unable to find service on the low tier, it sends a handoff request to its current radio port, thereby initiating a sequence of events in switching center 1500 that causes the assignment of a channel on the high tier.

Once the mobile telephone is informed of the channel assigned, it performs the handoff to the new channel.

Thus, when mobile telephone 1105 is receiving a speech signal from one of the radio ports, circuitry in mobile telephone 1105 and in the radio port causes mobile telephone 1105 to receive the speech signal from another one of the radio ports or from one of the base stations.

The handoff from the high-tier to the low-tier relies on a base-station procedure that detects when the quality of the connection is deteriorating, and therefore that the subscriber is a candidate for handover. When this occurs, the base-station commands the mobile telephone to scan for suitable low tier that may be available. The mobile telephone reserves an available channel on the low tier by scanning the low tier carriers, and the base-station initiates the sequence of events that permits the handoff to the low-tier reserved channel.

Although the preferred embodiment of the invention employs digital methods of sending the speech signal to the telephones, one of the tiers could also transmit the speech signal using an analog method. For example, the high tier might be the American Mobile Phone System (AMPS), which is the North American Analog Cellular Standard of the Telecommunication Industry Association. The effective information rate of the AMPS system is less than the 32 kbps information rate of the low tier of the preferred embodiment.

Alternative embodiments of the present invention may include digital speech interpolation (DSI), a method that increases the capacity of IS-54 by a factor of 1.8 to 2.5 using the silence intervals of the speech to transmit the speech spurts from other, as described in U.S. Pat. No. 5,299,198, the contents of which are herein incorporated by reference. Alternative embodiments may also include a multiple speech codec, having the current 8-kbps VSELP IS-54 codec, and new codecs at 4 and 16 kbps.

Additional advantages and modifications will readily occur to those skilled in the art. The invention, in its broader aspects, is therefore not limited to the specific details, representative apparatus, and illustrative examples shown and described. Various modifications and variations can be made to the present invention without departing from the scope or spirit of the invention, and it is intended that the present invention cover the modifications and variations provided they come within the scope of the appended claims and their equivalents.

What is claimed is:

1. A radio communications network having two systems comprising:

in a first system having a first air interface, a first plurality of stationary transceivers operating in a low tier, each including means for sending information to and receiving information from a mobile transceiver at a first rate during a call;

in a second system having a second air interface, a second plurality of stationary transceivers operating in a high tier, each including means for sending information to and receiving information from the mobile transceiver at a second rate during a call; and a switching center, coupled to the first plurality of stationary receivers and to the second plurality of stationary transceivers for routing calls between mobile transceivers and between mobile transceivers and fixed telephones and operable when the mobile transceiver is receiving information from one of the first plurality of stationary transceivers, for causing the mobile transceiver to instead receive the information from a different selected one of the first plurality of stationary transceivers or from one of the second plurality of stationary transceivers.

2. The system of claim 1 wherein the mobile transceiver includes:

means for determining a first signal strength of a signal from a determined one of the first plurality of transceivers;

means for determining a second signal strength of a signal from a determined one of the second plurality of transceivers;

means for transmitting to a selected one of the determined ones of the first or second plurality of transceivers, depending on the values of the first and second signal strength.

3. The system of claim 2 wherein the means for transmitting includes:

first communication means for transmitting to a selected one of the first plurality of stationary transceivers in a first power range having a first upper limit, and second communication means for transmitting to a selected one of the second plurality of stationary tranceivers in a second power range having a second upper limit greater than the first upper limit.

4. The system of claim 3 wherein the first upper limit does not exceed 1 watt.

5. The system of claim 1 wherein the second plurality of transceivers are located to communicate in a first area, and wherein the first plurality of transceivers are located to communicate in a portion of the first area.

6. The network of claim 1 wherein the first rate is at least 32 kbps.

7. The network of claim 6 wherein the second rate is substantially less than 32 kbps.

8. The network of claim 1 wherein said first system is a wireless access communications system.

9. The network of claim 1 wherein said second system is a standardized analog cellular telephony system.

10. The network of claim 1 wherein said second system is a standardized digital cellular telephony system.

11. A method of performing handoff from a low tier to a high tier in a mobile communications network having a first plurality of stationary transceivers in a first system having a first air interface operating in the low tier, each including means for sending information to and receiving information from a mobile transceiver at a first rate during a call, a second plurality of stationary transceivers in a second system having a second air interface operating in the high tier each including means for sending information to and receiving information from the mobile transceiver at a second rate during a call and a switching center coupled to the first and second pluralities of stationary transceivers, the method comprising the steps of:

maintaining communications with the mobile transceiver in the low tier as long as the mobile transceiver is able to establish communications with a low tier carrier exceeding a predefined threshold;

receiving a handoff request from the mobile transceiver at a current stationary transceiver when the mobile transceiver is unable to establish communications with low tier carrier exceeding the predefined threshold;

assigning a channel on the high tier in response to the received handoff request;

informing the mobile transceiver of the channel assigned; and switching the communication from the current stationary transceiver of the low tier to the assigned high tier channel.

12. The method of claim 11 further comprising the steps of:

determining a first signal strength of a carrier from a determined one of the first plurality of transceivers;

determining a second signal strength of a carrier from a determined one of the second plurality of transceivers;

transmitting to a selected one of the determined ones of the first or second plurality of transceivers, depending on the values of the first and second signal strength.

13. The method network of claim 12 wherein the step of transmitting includes:

transmitting in a first power range having a first upper limit, and transmitting in a second power range having a second upper limit greater than the first upper limit.

14. The method of claim 13 wherein the first upper limit does not exceed 1 watt.

15. The method network of claim 11 wherein the second plurality of transceivers are located to communicate in a first area, and wherein the first plurality of transceivers are located to communicate in a portion of the first area.

16. A method of performing handoff from a high tier to a low tier in a mobile communications network having a first plurality of stationary transceivers in a first system having a first air interface operating in the low tier, each including means for sending information to and receiving information from a mobile transceiver at a first rate during a call, a second plurality of stationary transceivers in a second system having a second air interface operating in the high tier each including means for sending information to and receiving information from the mobile transceiver at a second rate during a call and a switching center coupled to the first and second pluralities of stationary transceivers, the method comprising the steps of:

monitoring at one of the second plurality of stationary transceivers, the mobile transceiver radio connection with said one of the second plurality of stationary transceivers for quality;

when the quality of the radio connection deteriorates, commanding the mobile transceiver from said one of the second plurality of stationary transceivers to scan for available low tier channels;

reserving a low tier channel; and at the switching center, switching a communication corresponding to the monitored radio connection from said one of the second plurality of stationary transceivers to the reserved low tier channel.

* * * * *